(12) United States Patent
Murakami et al.

(10) Patent No.: US 11,753,572 B2
(45) Date of Patent: Sep. 12, 2023

(54) ADDITIVE FOR CEMENT SLURRY FOR WELL AND METHOD FOR PRODUCING SAID ADDITIVE, CEMENT SLURRY FOR WELL, AND CEMENTING METHOD FOR WELL

(71) Applicant: Nissan Chemical Corporation, Tokyo (JP)

(72) Inventors: Satoru Murakami, Sodegaura (JP); Masaki Kimata, Sodegaura (JP); Isao Oota, Sodegaura (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 106 days.

(21) Appl. No.: 17/604,093

(22) PCT Filed: Apr. 7, 2020

(86) PCT No.: PCT/JP2020/015614
§ 371 (c)(1),
(2) Date: Oct. 15, 2021

(87) PCT Pub. No.: WO2020/217966
PCT Pub. Date: Oct. 29, 2020

(65) Prior Publication Data
US 2022/0220357 A1 Jul. 14, 2022

(30) Foreign Application Priority Data
Apr. 24, 2019 (JP) ................................. 2019-082615

(51) Int. Cl.
*C09K 8/48* (2006.01)
*C04B 14/06* (2006.01)
(Continued)

(52) U.S. Cl.
CPC ................ *C09K 8/48* (2013.01); *C04B 14/06* (2013.01); *C04B 14/104* (2013.01);
(Continued)

(58) Field of Classification Search
CPC ......... C09K 8/48; C04B 14/06; C04B 14/104; C04B 18/027; C04B 28/02;
(Continued)

(56) References Cited

U.S. PATENT DOCUMENTS

| | | | |
|---|---|---|---|
| 3,669,701 | A | 6/1972 | Biederman, Jr. |
| 4,721,160 | A | 1/1988 | Parcevaux et al. |

(Continued)

FOREIGN PATENT DOCUMENTS

| | | |
|---|---|---|
| CN | 1086286 A | 5/1994 |
| JP | 62-38314 B2 | 8/1987 |

(Continued)

OTHER PUBLICATIONS

International Search Report, issued in PCT/JP2020/015614, PCT/ISA/210, dated Jun. 23, 2020.
Chinese Office Action and Search Report for Chinese Application No. 202080030395.3, dated Jun. 15, 2022, with English translation.

*Primary Examiner* — Crystal J. Lee
(74) *Attorney, Agent, or Firm* — Birch, Stewart, Kolasch & Birch, LLP

(57) ABSTRACT

An additive for a cement slurry for a well that is capable of suppressing the generation of free water and preventing flotation/separation of low-specific-gravity aggregate while securing sufficient cement strength even at a high temperature and a method for producing this additive are disclosed. The additive contains an aqueous dispersion of silica and a layered silicate.

17 Claims, 1 Drawing Sheet

(a) Example 1  (b) Example 2  (c) Example 3

(d) Comparative Example 1  (e) Comparative Example 2  (f) Comparative Example 3  (g) Comparative Example 4

Photograph of external appearance of hardened cement in Examples 1 to 3 and Comparative Example 4

(51) Int. Cl.
*C04B 14/10* (2006.01)
*C04B 18/02* (2006.01)
*C04B 28/02* (2006.01)
*C04B 40/00* (2006.01)
*E21B 33/14* (2006.01)
*C04B 103/24* (2006.01)
*C04B 111/00* (2006.01)
*C04B 111/40* (2006.01)

(52) U.S. Cl.
CPC ............ *C04B 18/027* (2013.01); *C04B 28/02* (2013.01); *C04B 40/0039* (2013.01); *E21B 33/14* (2013.01); *C04B 2103/24* (2013.01); *C04B 2111/00706* (2013.01); *C04B 2111/40* (2013.01)

(58) Field of Classification Search
CPC ............ C04B 40/0039; C04B 2103/24; C04B 2111/00706; C04B 2111/40; E21B 33/14
See application file for complete search history.

(56) References Cited

U.S. PATENT DOCUMENTS

| | | |
|---|---|---|
| 8,603,952 B2 | 12/2013 | Roddy et al. |
| 2015/0198010 A1 | 7/2015 | Doan et al. |
| 2016/0160109 A1* | 6/2016 | Patil ..................... C09K 8/467 |
| | | 106/714 |
| 2016/0177663 A1 | 6/2016 | Rahman et al. |
| 2017/0240469 A1 | 8/2017 | Rahman et al. |
| 2018/0037795 A1 | 2/2018 | Goel et al. |

FOREIGN PATENT DOCUMENTS

| | | | |
|---|---|---|---|
| JP | 4-97929 A | 3/1992 | |
| JP | H0497929 A | * 3/1992 | ............ C04B 14/04 |
| JP | 3574536 B2 | 10/2004 | |
| JP | 2008-214537 A | 9/2008 | |
| JP | 2016-536432 A | 11/2016 | |
| WO | WO 2015/034733 A1 | 3/2015 | |

* cited by examiner

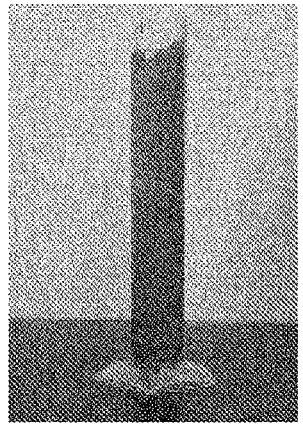 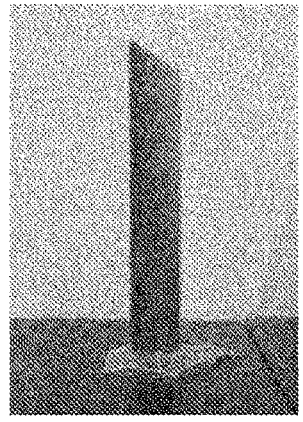 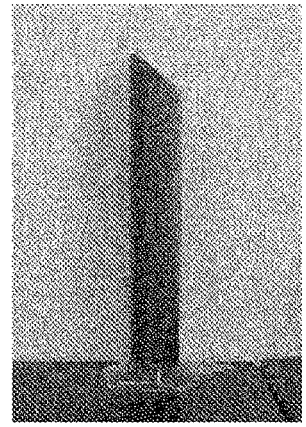
(a) Example 1   (b) Example 2   (c) Example 3
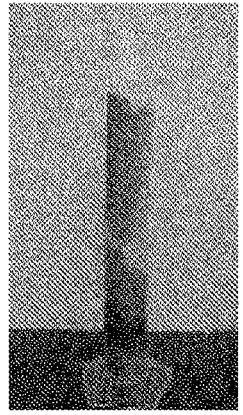 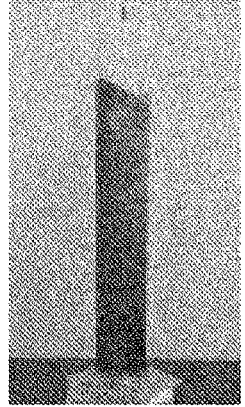 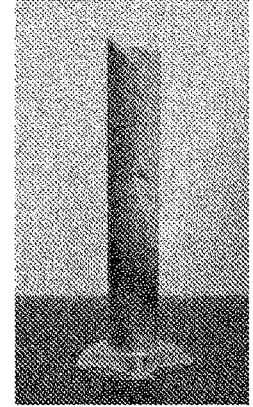 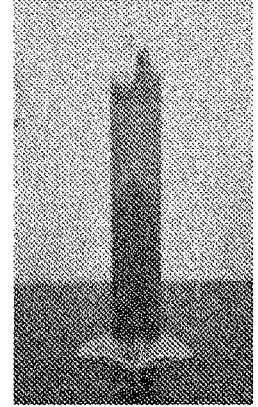
(d) Comparative Example 1   (e) Comparative Example 2   (f) Comparative Example 3   (g) Comparative Example 4
Photograph of external appearance of hardened cement in Examples 1 to 3 and Comparative Example 4

ADDITIVE FOR CEMENT SLURRY FOR WELL AND METHOD FOR PRODUCING SAID ADDITIVE, CEMENT SLURRY FOR WELL, AND CEMENTING METHOD FOR WELL

TECHNICAL FIELD

The present invention relates to an additive for cement slurry for a well and a method for producing the same, cement slurry for a well, and a cementing method for a well.

BACKGROUND ART

In well boring for oil fields, gas fields and the like, cementing work of injecting cement slurry to a gap (also referred to as an annular gap: annulus, etc.) between a casing pipe and the stratum (wall) is carried out in order to fix or reinforce the casing pipe inserted as an inner frame in the well, to prevent corrosion, and to prevent the flow of groundwater into the well, in finishing the well.

The cement used in such work is defined as various types of oil well cement on the basis of class or sulfate resistance according to the API specification (specification regarding petroleum stipulated by the American Petroleum Institute) as a specification that takes required performance into consideration. Among others, class G cement is cement most commonly used for oil well boring.

The cement is designed according to well conditions and supplemented with water and a light-weight aggregate as well as an additive such as a cement hardening accelerator, a cement hardening retarder, a cement dispersant, a cement dehydration regulator, a cement strength stabilizer or a lost circulation material for preparation.

The cementing refers to the application of cement slurry prepared from cement and water or dissolution water containing an additive to various locations within a well or to the inside or outside of a casing.

In the well boring for oil fields, gas fields and the like, boring work using a bit (drilling tool) and the cementing work described above are repetitively carried out, and both the temperature and pressure of a site of work are elevated with increase in the depth of an oil well. In recent years, boring techniques have been improved, and boring has been actively performed in oil field and gas oil field pools in deep layers having a depth of 500 to 1000 m or more. Thus, there is a demand for the design of cement slurry that permits cementing even in a high-temperature and high-pressure environment.

However, the deviation of cement slurry to a high-permeability layer (hereinafter, this phenomenon is also referred to as lost circulation) becomes severe with elevation in pressure. Therefore, a casing cannot be fixed or reinforced even if cement slurry is injected to a gap between a casing pipe inserted in the well and the stratum. This causes large harmful effects on cementing work. As measures thereagainst, a method has been used which involves decreasing the specific weight of cement slurry, thereby lowering a pressure applied to the stratum and by extension, suppressing lost circulation.

Methods such as increase in amount of water and the addition of a light-weight aggregate such as a hollow particle are known as methods for decreasing the specific weight of cement slurry.

The increase in amount of water makes material segregation (increased content of free water) conspicuous in slurry. The addition of a light-weight aggregate in a large amount causes floatation separation of the light-weight aggregate in cement slurry so that the aggregate becomes inhomogeneous, resulting in marked reduction in fluidity or inhomogeneous hardening (see Patent Document 2).

As a solution to such an inhomogeneous light-weight aggregate, Patent Document 1 discloses that for preventing the floatation separation of a regulator for light weight such as pearlite, fly ash, diatomaceous earth or microsilica after cement slurry preparation, it is preferred to add 2% by weight or more (preferably 3 to 8% by weight; an amount with respect to a cement composition) of bentonite at the same time with the specific weight regulator.

However, Patent Document 2 discloses that if highly swellable bentonite is added in a large amount, the addition of the bentonite reduces cement strength at a high temperature of 250° C. or higher.

Patent Document 3 discloses that 0.1 to 25% BWOC of a 1 to 400 nm noncolloidal nanoclay mineral is added for the control of lost circulation. The cement slurry used therein has a specific weight of 1.61 to 1.88 and is thus medium-weight or heavy-weight cement slurry.

Patent Document 4 describes a light-weight cement composition containing 20% to 100% BWOC of hollow spherical silica, 0.25% to 20% BWOC of bentonite component, 1% to 100% BWOC of a fine calcium carbonate powder, 1% to 100% BWOC of a calcium carbonate medium powder, 1% to 100% BWOC of a silica sand composition, and a silica flour composition. The density of cement slurry disclosed therein is 83 pcf (specific weight: 1.33).

As mentioned above, the suppression of the lost circulation of cement slurry is required in the step of fixing or reinforcing a casing by injecting cement slurry to a gap between a casing pipe inserted in the well and the stratum at the time of field well boring for oil fields and gas oil fields, particularly, in a high-temperature and high-pressure environment. Although light-weight cement slurry supplemented with a light-weight aggregate is used for the suppression of lost circulation, the lost circulation cannot be suppressed unless the floatation separation of the light-weight aggregate in the cement slurry is suppressed. Hence, there is a demand for an additive that suppresses the floatation separation of a light-weight aggregate in light-weight cement slurry.

PRIOR ART DOCUMENTS

Patent Document

Patent Document 1: JP 62-38314 B
Patent Document 2 Japanese Patent No. 3574536
Patent Document 3: U.S. Pat. No. 8,603,952
Patent Document 4: International Publication No. WO2015/034733

SUMMARY OF INVENTION

Technical Problem

However, a method depending on increase in amount of water in order to obtain light-weight cement slurry disadvantageously makes material segregation (increased content of free water) conspicuous in cement slurry.

If highly swellable bentonite or the like is added in order to prevent this increased content of free water, the addition of the bentonite reduces cement strength at a high temperature of 250° C. or higher. Therefore, the additive is not preferred according to the description of Patent Document 2.

The addition of a light-weight aggregate in a large amount disadvantageously causes floatation separation of the light-weight aggregate in cement slurry so that the aggregate becomes inhomogeneous, resulting in marked reduction in fluidity or inhomogeneous hardening of the cement slurry.

The present invention has been made in light of these circumstances. An object of the present invention is to provide an additive for cement slurry for a well which can suppress the occurrence of free water even at a high temperature while securing sufficient cement strength, and suppress the floatation separation of a light-weight aggregate, and a method for producing the same.

Another object of the present invention is to provide cement slurry for a well, comprising the additive described above.

A further object of the present invention is to provide a cementing method for a well using the cement slurry for a well described above.

Solution to Problem

The present inventors have conducted diligent studies on the objects and consequently completed the present invention by finding that: an additive containing an aqueous dispersion comprising layered silicate (e.g., smectite group layered silicate or purified bentonite) and silica as a dispersoid, more preferably an aqueous dispersion produced under specific conditions and/or comprising the dispersoid under specific conditions is suitably used as an additive for cement slurry for a well; and this additive contained in cement slurry for a well can suppress the maldistribution of a light-weight aggregate in the cement slurry and produces sufficient cement strength.

Specifically, aspects of the present invention are as follows.

<1> An additive for cement slurry for a well, comprising an aqueous dispersion of layered silicate and silica.

<2> The additive for cement slurry for a well according to <1>, wherein the well is an oil well or a geothermal well.

<3> The additive for cement slurry for a well according to <1> or <2>, wherein
  a solid content concentration of the layered silicate is 0.01 to 5% by mass,
  a solid content concentration of the silica is 0.3 to 30% by mass,
  a mass ratio of the layered silicate to the silica is 0.01 to 0.1, and
  an average particle size of a dispersoid in the aqueous dispersion by laser diffractometry is 0.1 to 30.0 μm.

<4> The additive for cement slurry for a well according to any one of <1> to <3>, wherein the layered silicate is at least one layered silicate selected from the group consisting of montmorillonite, hectorite, saponite, stevensite, beidellite, volkonskoite, nontronite and sauconite.

<5> The additive for cement slurry for a well according to any one of <1> to <4>, wherein the layered silicate is purified bentonite containing 90% by mass to 99.9% by mass of montmorillonite.

<6> The additive for cement slurry for a well according to any one of <1> to <5>, wherein pH is 2 to 11.

<7> A method for producing an additive for cement slurry for a well according to any one of <1> to <6>, comprising the step of
  adding layered silicate to an aqueous dispersion of silica and mixing the resultant with stirring to obtain an aqueous dispersion of layered silicate and silica.

<8> A method for producing an additive for cement slurry for a well according to any one of <1> to <6>, comprising the steps of:
  adding layered silicate to water and mixing the resultant with stirring to obtain an aqueous dispersion of layered silicate; and
  adding the aqueous dispersion of layered silicate to an aqueous dispersion of silica and mixing the resultant with stirring to obtain an aqueous dispersion of layered silicate and silica.

<9> The method for producing an additive for cement slurry for a well according to <7> or <8>, wherein the aqueous dispersion of silica is formed using silica having an average particle size of 3 to 300 nm converted from a specific surface area obtained through measurement by a nitrogen adsorption method.

<10> Cement slurry for a well, comprising an additive according to any one of <1> to <6>, wherein the cement slurry for a well comprises
  0.001 to 0.05% BWOC of layered silicate,
  0.01 to 0.8% BWOC of silica,
  50 to 80% BWOC of water, and
  10 to 50% BWOC of a light-weight aggregate.

<11> The cement slurry for a well according to <10>, further comprising
  0.1 to 5% BWOC of a cement hardening retarder, and
  0.001 to 10% BWOC of at least one auxiliary agent selected from the group consisting of a dehydration regulator, an antifoamer, a hardening accelerator, a cement dispersant, a cement strength stabilizer, and a lost circulation material.

<12> The cement slurry for a well according to <10> or <11>, wherein the light-weight aggregate is at least one hollow particle selected from the group consisting of a hollow aluminosilicate particle, a hollow borosilicate glass particle, a hollow silica particle, a hollow pearlite particle, a hollow fly ash particle, a hollow alumina particle, a hollow ceramic particle, a hollow polymer particle and a hollow carbon particle.

<13> The cement slurry for a well according to any one of <10> to <12>, wherein the specific weight is 1.2 or more and less than 1.6.

<14> The cement slurry for a well according to any one of <10> to <13>, wherein when a 50 mm in diameter×300 mm high cylindrical hardened cement obtained by hardening the cement slurry for a well is equally divided into 3 portions which are an upper portion, a medium portion and a lower portion, difference in density of the hardened cement between the upper portion and the medium portion is 0.15 or more.

<15> A cementing method for a well, comprising injecting a cement slurry for a well according to any one of <10> to <14> to a gap between a casing pipe inserted in the well and the stratum in boring of the well, followed by hardening.

Advantageous Effects of Invention

The additive for cement slurry for a well of the present invention can efficiently prevent the deviation of cement slurry to the stratum (lost circulation) because the floatation separation of a light-weight aggregate in cement slurry for a well supplemented with this additive is suppressed in the step of fixing or reinforcing a casing by injecting the cement slurry to a gap between a casing pipe inserted in the well and the stratum at the time of field well boring for oil fields or gas oil fields in a high-temperature and high-pressure environment.

Use of the cement slurry for a well of the present invention can suppress the occurrence of free water while achieving high cement strength in a high-temperature and high-pressure oil layer, and suppress faulty workmanship (e.g., insufficient fixation of a casing due to lean cement which cannot fill the space between the casing and the stratum).

Thus, use of the additive for cement slurry for a well of the present invention in cement slurry for a well allows well finishing to be stably carried out with high productivity even in a high-temperature and high-pressure environment.

BRIEF DESCRIPTION OF DRAWING

FIG. 1 shows a photograph of the external appearance of hardened cement in Examples 1 to 3 and Comparative Example 4.

DESCRIPTION OF EMBODIMENTS

Hereinafter, preferred embodiments of the present invention will be described. However, the embodiments described below are given for illustrating the present invention. The present invention is not limited by these embodiments by any means.

In the present specification, a numerical range represented using "to" means a range that includes numerical values described before and after "to" as the lower limit value and the upper limit value.

Additive for Cement Slurry for Well

The additive for cement slurry for a well of the present invention comprises an aqueous dispersion of layered silicate and silica which are a dispersoid. As shown in Examples mentioned later, use of such an aqueous dispersion comprising both silica (aqueous silica sol) and layered silicate as essential constituents, as an additive for cement slurry for a well exerts a maldistribution suppressive effect on a light-weight aggregate.

In one embodiment of the present invention, in the additive for cement slurry for a well, the solid content concentration of the layered silicate is 0.01 to 5% by mass, the solid content concentration of the silica is 0.3 to 30% by mass, the mass ratio of the layered silicate to the silica is 0.01 to 0.1, and the average particle size of the dispersoid in the aqueous dispersion by laser diffractometry is 0.1 to 30.0 μm.

In one embodiment of the present invention, the pH of the additive for cement slurry for a well is 2 to 11.

The lower limit value of the range of the solid content concentration of the layered silicate is preferably 0.01% by mass, more preferably 0.5% by mass, further preferably 0.8% by mass. The upper limit value of the range of the solid content concentration of the layered silicate is preferably 5% by mass, more preferably 3% by mass, further preferably 1.5% by mass.

The solid content concentration of the layered silicate which is equal to or more than the lower limit value is preferred because cement slurry is easily prepared so as to suppress the floatation separation of a light-weight aggregate. The solid content concentration of the layered silicate which is equal to or less than the upper limit value is preferred because prepared cement slurry can be prevented from having too high viscosity and slurry can avoid becoming pasty or waxy.

The lower limit value of the range of the solid content concentration of the silica is preferably 0.3% by mass, more preferably 1% by mass, further preferably 5% by mass. The upper limit value of the range of the solid content concentration of the silica is preferably 30% by mass, more preferably 25% by mass, further preferably 20% by mass.

The solid content concentration of the silica which is equal to or more than the lower limit value is preferred because cement slurry is easily prepared so as to suppress the floatation separation of a light-weight aggregate. The solid content concentration of the silica which is equal to or less than the upper limit value is preferred because prepared cement slurry can be prevented from having too high viscosity and slurry can avoid becoming pasty or waxy.

The lower limit value of the range of the mass ratio of the layered silicate to the silica is preferably 0.01, more preferably 0.02, further preferably 0.04. The upper limit value of the range of the mass ratio of the layered silicate to the silica is preferably 0.1, more preferably 0.08, further preferably 0.06.

The mass ratio of the layered silicate to the silica which is equal to or more than the lower limit value is preferred because cement slurry is easily prepared so as to suppress the floatation separation of a light-weight aggregate. The mass ratio of the layered silicate to the silica which is equal to or less than the upper limit value is preferred because cement slurry is easily prepared so as to suppress the floatation separation of a light-weight aggregate.

The lower limit value of the range of the average particle size of the dispersoid in the aqueous dispersion is preferably 0.1 μm, more preferably 0.5 μm, further preferably 1 μm. The upper limit value of the range of the average particle size of the dispersoid in the aqueous dispersion is preferably 30.0 μm, more preferably 20 μm, further preferably 10 μm.

The average particle size of the dispersoid in the aqueous dispersion which is equal to or more than the lower limit value is preferred from the viewpoint of good preservation stability of the additive for cement slurry for a well of the present invention. The average particle size of the dispersoid in the aqueous dispersion which is equal to or less than the upper limit value is preferred because collections are easily formed in preparing the aqueous dispersion of layered silicate and silica by mixing and an effect of suppressing the floatation separation of a light-weight aggregate is not inhibited.

The pH of the additive for cement slurry for a well is usually 2 to 7, preferably 3 to 6, when the additive comprises an aqueous dispersion of layered silicate and acidic aqueous silica sol. Th pH is usually 9 to 11, preferably 9.5 to 10.5, when the additive comprises layered silicate and alkaline aqueous silica sol.

The pH of layered silicate and a smectite water dispersion is 2 to 11. The pH of a mixed dispersion of acidic aqueous silica sol and a water dispersion of smectite group layered silicate is 2 to 7. The pH of a mixed dispersion of alkaline aqueous silica sol and a water dispersion of smectite group layered silicate is 9 to 11.

(Layered Silicate)

Examples of the layered silicate used in the present invention include kaolin group layered silicate, pyrophyllite group layered silicate, smectite group layered silicate, vermiculite group layered silicate, mica group layered silicate, interlayer deficient mica layered silicate, brittle mica group layered silicate, chlorite group layered silicate, and interstratified mineral layered silicate.

Examples of the kaolin group layered silicate include lizardite, berthierine, amesite, cronstedtite, nepouite, kellyite, fraipontite, brindleyite, kaolinite, dickite, nacrite, halloysite, and odinite.

Examples of the pyrophyllite group layered silicate include talc, willemseite, kerolite, pimelite, pyrophyllite, and ferripyrophyllite.

Examples of the smectite group layered silicate include saponite, hectorite, sauconite, stevensite, swinefordite, montmorillonite, beidellite, nontronite, and volkonskoite.

Examples of the vermiculite group layered silicate include trioctahedral vermiculite and dioctahedral vermiculite.

Examples of the mica group layered silicate include biotite, phlogopite, lepidomelane, eastonite, siderophyllite, tetraferriphlogopite, lepidolite, polylithionite, muscovite, celadonite, ferroceladonite, ferroaluminoceladonite, aluminoceladonite, tobelite, and paragonite.

Examples of the interlayer deficient mica layered silicate include illite, glauconite, and brammallite.

Examples of the brittle mica group layered silicate include clintonite, kinoshitalite, bityite, anandite, and margarite.

Examples of the chlorite group layered silicate include clinochlore, chamosite, pennantite, nimite, baileychlore, donbassite, cookeite, and sudoite.

Examples of the interstratified mineral layered silicate include corrensite, hydrobiotite, aliettite, kulkeite, rectorite, tosudite, dozylite, lunijianlite, and saliotite.

In the present invention, layered silicate is preferred which forms a 2:1 layer structure where cations having positive charge (potassium ions, sodium ions, or calcium ions) or other interlayer substances (water) are sandwiched between layers. For example, smectite group layered silicate or vermiculite group layered silicate is preferred, and smectite group layered silicate is particularly preferred.

Saponite included in the smectite group layered silicate has a structure of $(Ca/2,Na)_{0.3}(Mg,Fe^{2+})_3(Si,Al)_4O_{10}(OH)_2 \cdot 4H_2O$, hectorite has a structure of $Na_{0.3}(Mg,Li)_3Si_4O_{10}(F,OH)_2 \cdot 4H_2O$, sauconite has a structure of $Na_{0.3}Zn_3(Si,Al)_4O_{10}(OH)_2 \cdot 4H_2O$, stevensite has a structure of $(Ca/2)_{0.3}Mg_3Si_4O_{10}(OH)_2 \cdot 4H_2O$, swinefordite has a structure of $(Ca/2,Na)_{0.3}(Li,Mg)_2(Si,Al)_4O_{10}(OH,F)_2 \cdot 2H_2O$, montmorillonite has a structure of $(Ca/2,Na)_{0.3}(Al,Mg)_2(Si)_4O_{10}(OH)_2 \cdot nH_2O$, beidellite has a structure of $(Ca/2,Na)_{0.3}Al_2(Si,Al)_4O_{10}(OH)_2 \cdot nH_2O$, nontronite has a structure of $Na_{0.3}Fe^{3+}(Si,Al)_4O_{10}(OH)_2 \cdot nH_2O$, and volkonskoite has a structure of $Ca_{0.3}(Cr^{3+},Mg,Fe^{3+})_3(Si,Al)_4O_{10}(OH)_2 \cdot nH_2O$.

The layered silicate preferably comprises at least one layered silicate selected from the group consisting of montmorillonite, hectorite, saponite, stevensite, beidellite, volkonskoite, nontronite and sauconite.

Bentonite is layered silicate containing montmorillonite. Natural bentonite contains impurities other than clay mineral such as crystalline silica components and feldspar. Such impurities do not function to suppress the floatation separation of a light-weight aggregate, and might deteriorate the preservation stability of the additive for cement slurry for a well. Therefore, purified bentonite having a montmorillonite content improved to 90% by mass to 99.9% by mass by the removal of these impurities can be suitably used. Specifically, in the present invention, the layered silicate is particularly preferably purified bentonite containing 90% by mass to 99.9% by mass of montmorillonite. The content of montmorillonite can be determined as a delta by calculating a crystalline silica content (% by mass) from the diffraction peak intensity of crystalline silica in the purified bentonite by use of X-ray powder diffractometry.

The purified bentonite is commercially available, mainly, in the form of a powder, and such a commercially available product can be used. Examples of the commercially available product of purified bentonite containing 90% to 99.9% montmorillonite (the content of montmorillonite in bentonite is indicated by purity) include trade name Kunipia F (purity: 99.3%, manufactured by Kunimine Industries Co., Ltd.), trade name Kunipia G (purity: 99.3%, manufactured by Kunimine Industries Co., Ltd.), and trade name Polargel HV (purity: 99.5%, manufactured by Volclay Japan Co., Ltd.). Examples of the commercially available product of synthetic saponite include trade name Sumecton-SA (purity: 99.9%, manufactured by Kunimine Industries Co., Ltd.). Examples of the commercially available product of synthetic stevensite include trade name Sumecton-ST (purity: 99.9%, manufactured by Kunimine Industries Co., Ltd.). Examples of the commercially available product of synthetic hectorite include trade name Sumecton-SWN (purity: 99.9%, manufactured by Kunimine Industries Co., Ltd.).

(Silica)

In the present invention, the average particle size of the aqueous silica sol (colloidal silica particle) refers to a specific surface area diameter obtained through measurement by a nitrogen adsorption method (BET method) or a Sears method particle size, unless otherwise specified.

The specific surface area diameter obtained through measurement by a nitrogen adsorption method (BET method) (average particle size (specific surface area diameter) D (nm)) is given according to the expression $D \text{ (nm)} = 2720/S$ from specific surface area S ($m^2/g$) measured by the nitrogen adsorption method.

The Sears method particle size refers to an average particle size measured on the basis of a rapid measurement method for colloidal silica particle sizes described in the document: G. W. Sears, Anal. Chem. 28 (12), p. 1981, 1956. Specifically, the specific surface area of colloidal silica is determined from an amount of 0.1 N NaOH required to titrate colloidal silica corresponding to 1.5 g of $SiO_2$ from pH 4 to pH 9, and an equivalent size (specific surface area diameter) is calculated therefrom.

In the present invention, the average particle size of the aqueous silica sol (colloidal silica particle) by the nitrogen adsorption method (BET method) or the Sears method is 3 to 200 nm, or 3 to 150 nm, or 3 to 100 nm, or 3 to 30 nm. Aqueous silica sol having a silica concentration of 5 to 50% by mass is generally commercially available and can be readily obtained. Any of alkaline aqueous silica sol and acidic aqueous silica sol can be used as the aqueous silica sol.

A value of the average particle size by the Sears method can be used for an average particle size of less than 10 nm, while a value of the average particle size by the BET method can be used for an average particle size of 10 nm or larger.

Examples of the commercially available alkaline aqueous silica sol include Snowtex® ST-XS, Snowtex ST-S, Snowtex ST-30, Snowtex ST-M30, Snowtex ST-20L, Snowtex ST-YL, and Snowtex ST-ZL (all manufactured by Nissan Chemical Corp.). Examples of the acidic aqueous silica sol include Snowtex® ST-OXS, Snowtex ST-OS, Snowtex ST-O, Snowtex ST-O-40, Snowtex ST-OL, Snowtex ST-OYL, and Snowtex ST-OZL-35 (all manufactured by Nissan Chemical Corp.).

At least a portion of a silane compound mentioned later may be bonded to a partial surface of the silica particle in the aqueous silica sol of the present invention.

Preferred examples of the silane compound can include silane coupling agents having at least one group selected from the group consisting of a vinyl group, an ether group, an epoxy group, a styryl group, a methacrylic group, an acrylic group, an amino group and an isocyanurate group as an organic functional group. Among them, a silane coupling agent having an epoxy group can be a particularly preferred silane compound.

Method for Producing Additive for Cement Slurry for Well

In one embodiment of the present invention, the additive for cement slurry for a well comprises an aqueous dispersion in which the dispersoids layered silicate and silica are uniformly dispersed in water.

One example of the method for producing the additive for cement slurry for a well of the present invention (prescription-1 and prescription-2) will be shown below.

(Prescription-1)

Prescription-1 is a method comprising the step of adding a powder of layered silicate to an aqueous dispersion of silica (aqueous silica sol) and mixing the resultant with stirring for uniform dispersion to obtain an aqueous dispersion of layered silicate and silica.

(Prescription-2)

Prescription-2 is a method comprising the steps of: adding a powder of layered silicate to water and mixing the resultant with stirring for dispersion to obtain an aqueous dispersion of layered silicate; and adding an aqueous dispersion of layered silicate to the aqueous dispersion of silica and mixing the resultant with stirring for uniform dispersion to obtain an aqueous dispersion of layered silicate and silica.

Any of those mentioned above can be suitably used as the layered silicate and silica as a dispersoid. Particularly, in the case of using layered silicate such as bentonite, it is preferred to use a purified form with a reduced amount of impurities and it is more preferred to use a form having a purity of 90% or more.

The aqueous dispersion of silica described above is formed using silica having an average particle size of 3 to 300 nm converted from a specific surface area obtained through measurement by a nitrogen adsorption method.

The lower limit value of the average particle size of the silica is preferably 3 nm, more preferably 5 nm. The upper limit value of the average particle size of the silica is preferably 300 nm, more preferably 200 nm, further preferably 100 nm.

The average particle size of the silica which is equal to or more than the lower limit value is preferred from the viewpoint of good preservation stability of the additive for cement slurry for a well of the present invention. The average particle size of the silica which is equal to or less than the upper limit value is preferred from the viewpoint of low cost of the aqueous dispersion of silica (aqueous silica sol).

A composition obtained by use of the prescription can function effectively as the additive for cement slurry for a well of the invention of the present application.

Cement Slurry for Well

The cement slurry for a well of the present invention comprises, as an additive, a composition comprising an aqueous dispersion of layered silicate and silica which are a dispersoid. As shown in Examples mentioned later, use of such an aqueous dispersion comprising both silica (aqueous silica sol) and layered silicate as essential constituents, contained as an additive for cement slurry for a well in cement slurry exerts a maldistribution suppressive effect on a light-weight aggregate. Also, the advantage of high cement strength is obtained because homogeneous hardened cement is obtained.

In one embodiment of the present invention, the cement slurry for a well is slurry comprising the additive for cement slurry for a well in any form of the present invention, and comprises cement such as oil well cement and also comprises 0.001 to 0.05% BWOC of layered silicate, 0.01 to 0.8% BWOC of silica, 50 to 80% BWOC of water, and 10 to 50% BWOC of a light-weight aggregate, with respect to the cement.

In this context, the % BWOC means % by mass based on the dry solid content of cement (by weight of cement) and is a technical item well known to those skilled in the art.

The lower limit value of the range of the content ratio of the layered silicate is preferably 0.001% BWOC, more preferably 0.002% BWOC, further preferably 0.003% BWOC. The upper limit value of the range of the content ratio of the layered silicate is preferably 0.05% BWOC, more preferably 0.03% BWOC, further preferably 0.02% BWOC.

The content ratio of the layered silicate which is equal to or more than the lower limit value is preferred because a sufficient amount of layered silicate can be secured and a floatation suppressive effect on the light-weight aggregate is enhanced. The content ratio of the layered silicate which is equal to or less than the upper limit value is preferred because the cement slurry can be prevented from having too high viscosity and a predetermined amount of cement can be charged without difficulty.

The lower limit value of the range of the content ratio of the silica (solid content) is preferably 0.01% BWOC, more preferably 0.02% BWOC, further preferably 0.05% BWOC. The upper limit value of the range of the content ratio of the silica (solid content) is preferably 0.8% BWOC, more preferably 0.5% BWOC, further preferably 0.3% BWOC.

The content ratio of the silica (solid content) which is equal to or more than the lower limit value is preferred because the cement slurry can be prevented from having too low viscosity and a floatation suppressive effect on the light-weight aggregate is enhanced. The content ratio of the silica (solid content) which is equal to or less than the upper limit value is preferred because the cement slurry can be prevented from having too high viscosity during preparation and a predetermined amount of cement can be charged without difficulty.

The cement slurry for a well of the present invention may comprise 50 to 80% BWOC of water. Fresh water, tap water, industrial water, pure water or seawater, etc. can be appropriately used as the water used.

The cement slurry for a well of the present invention can comprise a light-weight aggregate which is at least one hollow particle selected from the group consisting of a hollow aluminosilicate particle, a hollow borosilicate glass particle, a hollow silica particle, a hollow pearlite particle, a hollow fly ash particle, a hollow alumina particle, a hollow ceramic particle, a hollow polymer particle and a hollow carbon particle.

The cement slurry for a well of the present invention may comprise 10 to 50% BWOC of the light-weight aggregate in terms of a solid content. This can suitably decrease the specific weight of the cement slurry (e.g., to a specific weight of 1.2 or more and less than 1.6).

(Other Components Contained)

The cement slurry for a well of the present invention may also contain a cement hardening retarder, a dehydration regulator, an antifoamer, a hardening accelerator, a cement dispersant, a cement strength stabilizer, and a lost circulation material, in addition to the oil well cement, the additive for cement slurry for a well, the light-weight aggregate and water.

Any of class A cement to class H cement of the specification "APISPEC 10A Specification for Cements and Materials for Well" of API (American Petroleum Institute) can be used as the oil well cement. Among them, class G cement and class H cement are more preferred because quality governing is easily performed with an additive or an auxiliary agent and they can be used in a wide range of depths or temperatures.

The cement hardening retarder is used for maintaining moderate fluidity of the cement slurry until the completion of cementing work and adjusting a thickening time. The cement hardening retarder contains a main component such as ligninsulfonates, naphthalenesulfonates, and borates.

The dehydration regulator can be used for the purpose of, for example, protecting the stratum sensitive to water or preventing the early dehydration of slurry, and contains a main component such as organic high-molecular-weight polymers and vinylamide-vinylsulfonic acid copolymers.

The antifoamer contains a main component such as silicon compounds and higher alcohols.

The cement hardening accelerator is used for the purpose of, for example, initial strength or the shortening of a waiting time for hardening, and contains a main component such as calcium chloride, liquid glass, and gypsum.

The cement dispersant can be used for the purpose of, for example, lowering the viscosity of the cement slurry and enhancing replacement efficiency with mud water, and contains a main component such as naphthalenesulfonic acid formalin condensates, polyacrylic acid condensates and sulfonated melamine condensates.

The cement strength stabilizer contains a main component such as fly ash and silica.

The lost circulation material is used for preventing lost circulation, is in the form of, for example, inactive grains that do not influence the properties of cement, and contains a main component such as walnut hulls, vermiculite, gilsonite, mica, and cellophane fragments.

The cement slurry for a well of the present invention may contain a cement composition for an ordinary structure, various types of cement or aggregate for use in concrete compositions, and other additives for use in such cement compositions or the like, in addition to the cement such as oil well cement, the additive for cement slurry for a well in any form of the present invention, the cement hardening retarder, and other additives or auxiliary agents as described above.

Examples of the conventional common cement for an ordinary structure that may be used include Portland cement (e.g., normal Portland cement, high-early-strength Portland cement, ultrahigh-early-strength Portland cement, low-heat/moderate-heat Portland cement, and sulfate-resisting Portland cement), various types of blended cement (blast furnace cement, silica cement, fly ash cement, etc.), white Portland cement, alumina cement, ultrarapid hardening cement (one-clinker ultrarapid hardening cement, two-clinker ultrarapid hardening cement, and magnesium phosphate cement), cement for grout, low-heat cement (low-heat blast furnace cement, fly ash blended low-heat blast furnace cement, and belite-rich cement), ultra-high strength cement, cement-based solidifying materials, and eco-cement (cement produced by using one or more of incinerated ash of municipal waste and incinerated ash of sewage sludge as a raw material). Further, a fine powder such as blast furnace slag, fly ash, cinder ash, clinker ash, husk ash, fumed silica, a silica powder or a limestone powder, or gypsum may be added as an admixture.

Gravels, crushed stones, granulated slag, and a recycled aggregate as well as a refractory aggregate such as silica, clay, zircon, high-alumina, silicon carbide, graphite, chrome, chrome-magnesia, or magnesia may be used as the aggregate.

Known cement or concrete additives such as high-range AE water reducing agents, high-range water reducing agents, AE water reducing agents, water reducing agents, air-entraining agents (AE agents), foaming agents, segregation controlling admixtures, thickeners, shrinkage reducing agents, curing compounds, and water repellents can be blended as other additives for use in the cement composition or the like.

In the cement slurry for a well of the present invention, as shown in Examples mentioned later, when a 50 mm in diameter×300 mm high cylindrical hardened cement obtained by hardening the cement slurry for a well is equally divided into 3 portions which are an upper portion, a medium portion and a lower portion, difference in density of the hardened cement between the upper portion and the medium portion is 0.15 or more, and a maldistribution suppressive effect on the light-weight aggregate is exerted.

Cementing Method for Well

In one embodiment of the present invention, the cementing method for a well is a method using the cement slurry for a well in any form of the present invention and is a method comprising injecting the cement slurry for a well to a gap between a casing pipe inserted in the well and the stratum, followed by hardening.

In one embodiment of the present invention, the cementing method for a well can suppress unfavorable lost circulation by using the cement slurry for a well in any form of the present invention in filling the void space between the stratum and a casing pipe with oil well cement in boring for oil fields or gasoil fields.

EXAMPLES

Hereinafter, the present invention will be described in more detail with reference to Preparation Examples of an additive for (light-weight) cement slurry for a well, Examples and Comparative Examples. However, the present invention is not limited by these examples by any means.

Measurement Apparatus and Method

The additive for light-weight cement slurry was analyzed (silica concentration, pH value, laser diffractometric average particle size, and viscosity) using the following apparatuses.

Silica solid content concentration: Alkali was removed from aqueous silica sol using a hydrogen cation-exchange resin, followed by drying. The silica solid content concentration was determined from a residue of calcination at 1000° C.

pH: A pH meter (manufactured by DKK-TOA Corp.) was used.

Viscosity: A type B viscometer (manufactured by Tokyo Keiki Inc.) was used.

DLS average particle size (dynamic light scattering particle size): A dynamic light scattering particle size measurement apparatus Zetasizer Nano (manufactured by Malvern Panalytical, a part of Spectris plc) was used.

Laser diffractometric average particle size: A laser diffractometric particle measurement apparatus SALD-7500 (manufactured by Shimadzu Corp.) was used.

<Preparation Conditions of Additive for Light-Weight Cement Slurry>

<Additive A for Light-Weight Cement Slurry>

According to the prescription-1, a 500 ml styrol bottle was charged with 300 g of the aqueous silica sol of trade name Snowtex-XS (pH=9.6, $SiO_2$ concentration=20.5% by mass, Sears particle size=5.0 nm, manufactured by Nissan Chemical Corp.), then charged with 3.5 g of the purified bentonite containing 99.3% montmorillonite component (trade name Kunipia F, manufactured by Kunimine Industries Co., Ltd.) with stirring at 500 rpm using a stirrer equipped with a propeller blade of 40 mm in diameter, and then stirred for 2 hours. In this way, additive A for light-weight cement slurry was prepared which contained 1.2% by mass of montmorillonite and 20.3% by mass of silica and had pH of 9.5, conductivity of 3980 μS/cm, viscosity of 17 mPa·s, and a laser diffractometric average particle size of 19.4 μm.

<Additive B for Light-Weight Cement Slurry>

According to the prescription-1, a 500 ml styrol bottle was charged with 394 g of the aqueous silica sol of trade name Snowtex-XS, then charged with 6.5 g of the purified bentonite containing 99.3% montmorillonite component (trade name Kunipia F, manufactured by Kunimine Industries Co., Ltd.) with stirring at 500 rpm using a stirrer equipped with a propeller blade of 40 mm in diameter, and then stirred for 2 hours. In this way, additive B for light-weight cement slurry was prepared which contained 1.6% by mass of montmorillonite and 20.2% by mass of silica and had pH of 9.5, conductivity of 4860 μS/cm, viscosity of 19 mPa·s, and a laser diffractometric average particle size of 18.5 μm.

<Additive C for Light-Weight Cement Slurry>

According to the prescription-2, a 500 ml styrol bottle was charged with 400 g of pure water, then charged with 14.5 g of the purified bentonite containing 99.3% montmorillonite component (trade name Kunipia F, manufactured by Kunimine Industries Co., Ltd.) with stirring at 500 rpm using a stirrer equipped with a propeller blade of 40 mm in diameter, and then stirred for 2 hours to prepare slurry having pH of 9.9, conductivity of 1190 μS/cm, a laser diffractometric average particle size of 1.8 μm, and a montmorillonite concentration of 3.5% by mass. Next, a 500 ml styrol bottle was charged with 300 g of the commercially available aqueous silica sol of trade name Snowtex-XS (pH=9.6, $SiO_2$ concentration=20.5% by mass, Sears particle size=5.0 nm, manufactured by Nissan Chemical Corp.), then charged with 48.6 g of the slurry having a montmorillonite concentration of 3.5% by mass with stirring at 500 rpm using a stirrer equipped with a propeller blade of 40 mm in diameter, and then stirred for 2 hours. In this way, additive C for light-weight cement slurry was prepared which contained 0.89% by mass of montmorillonite and 15.5% by mass of silica and had pH of 9.6, conductivity of 3750 μS/cm, viscosity of 21 mPa·s, and a laser diffractometric average particle size of 1.7 μm.

<Preparation of Cement Slurry and Physical Property Measurement of API Specification>

For cement slurry preparation in Example 1 to Example 3 and Comparative Example 1 to Comparative Example 4, 997 g of cement slurry was prepared in accordance with the API specification (specification regarding petroleum stipulated by the American Petroleum Institute) 10B-2 using a dedicated apparatus and the materials and the charging ratios (% BWOC) shown in Table 1. Specifically, a dedicated mixer was charged with pure water and charged with a commercially available dehydration regulator, the additive for light-weight cement slurry, a commercially available hardening retarder and antifoamer, and class G cement (manufactured by Ube-Mitsubishi Cement Corp.) in the blending amounts shown in Table 1 in 90 seconds while a stirring blade was rotated at 4,000 rpm. The number of revolutions of the stirring blade was increased to 12,000 rpm, and stirring was performed for 35 seconds to prepare cement slurry.

A slurry specific weight was calculated as to each cement slurry thus prepared by the following procedures. Further, the amount of free water, a thickening time test, cement strength, and fluid loss were evaluated using dedicated apparatuses that abided by the API specification.

1) Measurement of Slurry Specific Weight

The specific weight of 100 cc of the prepared cement slurry was measured using a stainless cup hydrometer having a capacity of 100 ml.

2) Measurement of Amount of Free Water

The cement slurry was conditioned by the method described in the section <Preparation of cement slurry and physical property measurement of API specification>. Then, a resin measuring cylinder having an object capacity of 250 cc was charged with 250 cc of the cement slurry temperature-adjusted to 88° C. over 30 minutes, and the measuring cylinder was tilted by 45 degrees and left standing for 2 hours. After the 2-hour still standing, water liberated in the upper portion of the slurry was collected with a dropper, and the amount thereof (% by volume per 250 cc of the slurry) was regarded as the amount of free water. The amount of free water is preferably 2% or less.

3) Thickening Time Test

A 500 cc aliquot was separated from the prepared cement slurry. A thickening time measurement apparatus Model 290 HPHT (High-Pressure, High-Temperature) Consistometer (manufactured by Fann Instrument Company) described in the API specification was charged therewith. Then, the temperature and the pressure were elevated to 150° C. and 3700 psi or to 180° C. and 5000 psi over 1 hour while the cement slurry was stirred with a stirring blade. The predetermined temperature and pressure were retained. Consistency was measured over time in the thickening time measurement apparatus from the start of the test, and this temperature was retained until the measurement value (Bearden consistency unit (BC)) reached 70 BC. The time from the start of heating to reaching 70 BC was regarded as a thickening time (min). The thickening time is preferably 2 hours to 6 hours.

4) Measurement of Cement Strength (Compressive Strength Test)

A 130 cc aliquot was separated from the prepared cement slurry. A compressive strength measurement apparatus Ultrasonic Cement Analyzer Model 304 described in the API specification was charged therewith. Then, the temperature and the pressure were elevated to 120° C. and 3700 psi or to 150° C. and 5000 psi over 1 hour. This temperature and pressure were retained for 3 hours. Then, the temperature was elevated to 150° C. or 180° C. over 20 hours. In this respect, compressive strength was regarded as cement strength. Here, higher cement strength is more preferred at 1000 psi.

5) Measurement of Fluid Loss

The cement slurry was conditioned by the method. Then, A 130 cc aliquot was separated from the cement slurry temperature-adjusted to 88° C. over 30 minutes. A fluid loss measurement apparatus Fluid Loss Test Instrument (manufactured by Fann Instrument Company) described in the API specification was charged therewith. Then, water generated (dehydration) from the cement slurry when a pressure of 1,000 psi was continuously applied thereto for 30 minutes under a condition of 88° C. was recovered into a resin measuring cylinder having a capacity of 100 cc. Amount $V_t$ of dehydration for the measurement time (30 min) was applied to expression 1 to calculate fluid loss.

[Expression 1]

$$\text{Fluid loss} = 2V_t \sqrt{\frac{30}{t}} \quad \text{(Expression 1)}$$

The API specification does not particularly define the numerical range of the fluid loss, but states that 100 ml or less is suitable.

Table 2 shows the obtained results of evaluating the specific weight, the amount of free water, the thickening time, the cement strength, and the fluid loss.

<Density Distribution Measurement of Hardened Cement>

Cement slurry was prepared twice under the same preparation conditions as in Example 1, Example 3 or Comparative Example 3. Each cement slurry thus prepared was evaluated for the density distribution of hardened cement by the following procedures.

A polyethylene bleeding bag (dimension: 50 mm in diameter×500 mm) was charged with 1200 g of each prepared cement slurry. The upper portion of the bleeding bag was laced with a vinyl string, and the resultant was hung on a net rack, followed by curing for 1 week in a constant-temperature room of 20° C. to prepare hardened cement.

Next, the prepared hardened cement was cut into three equal portions (upper, medium and lower) with a concrete cutter (manufactured by Nittoku K. K.) to prepare core donors. Then, the dimension and weight of each core donor were measured, and a density was calculated to measure a density distribution of the hardened cement. Difference in density between the upper portion and the medium portion was calculated.

If the maldistribution of a light-weight aggregate is not suppressed, cement components accumulate in the lower portion of the hardened product while the light-weight aggregate floats in the medium portion and the upper portion. Therefore, the difference in density is small between the upper portion and the medium portion. On the other hand, if the maldistribution of a light-weight aggregate is suppressed, cement components also spread in the medium portion of the hardened product so that the weight of the medium portion is larger than that of the upper portion. As a result, the difference in density is large between the upper portion and the medium portion. Here, the difference in density is preferably 0.15 or more, more preferably 0.20 or more.

Table 2 shows the obtained results about the densities of the upper portion, the medium portion and the lower portion of the hardened cement and the difference in density between the medium portion and the upper portion.

FIG. 1 shows a photograph of the external appearance of the obtained hardened cement.

TABLE 1

| | | Cement slurry component | | | | | | |
|---|---|---|---|---|---|---|---|---|
| | | Example 1 | Example 2 | Example 3 | Comparative Example 1 | Comparative Example 2 | Comparative Example 3 | Comparative Example 4 |
| Contents of additive for cement slurry | | Additive A | Additive B | Additive C | Not added | Silica sol alone | Purified bentonite alone | Purified bentonite and aqueous silica sol separately added during cement slurry preparation |
| Class G cement (% BWOC) | | 100.00 | 100.00 | 100.00 | 100.00 | 100.00 | 100.00 | 100.00 |
| Light-weight aggregate (% BWOC) | | 33.34 | 33.34 | 33.34 | 33.34 | 33.34 | 33.34 | 33.34 |
| Silica (% BWOC) | | 0.11 | 0.11 | 0.11 | 0 | 0.11 | 0 | 0.11 |
| Layered silica particle (% BWOC) | | 0.0065 | 0.0092 | 0.0065 | 0 | 0 | 0.0065 | 0.0065 |
| Pure water (% BWOC) | | 62.81 | 61.80 | 62.10 | 63.08 | 62.26 | 62.81 | 62.30 |
| Dehydration regulator (% BWOC) | | | 2.88 | | | | 2.88 | |
| Hardening retarder (% BWOC) | | | 0.96 | | | | 0.96 | |
| Antifoamer (% BWOC) | | | 0.12 | | | | 0.12 | |

TABLE 2

Evaluation results

| | Example 1 | Example 2 | Example 3 | Comparative Example 1 | Comparative Example 2 | Comparative Example 3 | Comparative Example 4 |
|---|---|---|---|---|---|---|---|
| Specific gravity | 1.45 | 1.48 | 1.43 | 1.48 | 1.47 | 1.48 | 1.48 |
| Amount of free water [% by volume] | 0 | 0 | 0 | 0 | 0 | 0 | 0 |
| Fluid loss | 40 | 42 | 44 | 42 | 46 | 20 | 28 |
| Thickening time | 6 hr and 00 min | 6 hr and 01 min | 5 hr and 53 min | — | 6 hr and 07 min | 7 hr and 54 min | 5 hr and 51 min |
| Cement strength [psi] | 1333 | 1418 | 1580 | — | 1157 | 1341 | 1181 |
| Maldistribution of light-weight aggregate | Small | Small | Small | Very large | Large | Very large | Slightly large |
| Density of upper portion of hardened cement (g/cm$^3$) | 1.04 | — | 1.04 | — | — | 0.93 | — |
| Density of medium portion of hardened cement (g/cm$^3$) | 1.21 | | 1.32 | | | 0.98 | |
| Density of lower portion of hardened cement (g/cm$^3$) | 1.88 | | 1.91 | | | 2.05 | |
| Difference in density between medium portion and upper portion of hardened cement | 0.17 | | 0.27 | | | 0.05 | |

Remarks: "—" means no data

<Discussion>

In the case of the cement slurry in Examples 1 to 3 supplemented with the additive for light-weight cement slurry prepared as an aqueous dispersion containing a silicate particle and a silica particle, it is evident that the maldistribution of the light-weight aggregate was clearly small as compared with Comparative Examples 1 to 4 (see Table 2 and the photograph of the external appearance of the hardened cement in FIG. 1). As shown in Table 2, in the case of Examples 1 to 3, the cement strength was 1300 psi or more in all the cases. It is thus evident that high-strength hardened cement was obtained. These results demonstrated that, in the case of Examples 1 to 3, the maldistribution of the light-weight aggregate was small and hardened cement having high strength was obtained.

By contrast, in the case of not adding the additive for light-weight cement slurry (Comparative Example 1), in the case of adding the aqueous silica sol alone (Comparative Example 2), and in the case of adding the purified bentonite alone (Comparative Example 3) in preparing the cement slurry, the maldistribution of the light-weight aggregate was large. In Comparative Example 2, the cement strength was 1157 psi, demonstrating that the strength of the hardened cement was also insufficient as compared with Examples 1 to 3 (see Table 2 and the photograph of the external appearance of the hardened cement in FIG. 1).

In the case of separately adding the layered silicate (purified bentonite) particle and the aqueous silica sol (Comparative Example 4) in preparing the cement slurry, the maldistribution of the light-weight aggregate was slightly large, and the cement strength was 1181 psi, demonstrating that the strength of the hardened cement was also insufficient as compared with Examples 1 to 3 (see Table 2 and the photograph of the external appearance of the hardened cement in FIG. 1).

As is evident from the result described above, use of the additive for light-weight cement slurry consisting of an aqueous dispersion comprising a layered silicate particle such as a smectite group layered silicate particle and a silica particle in preparing light-weight cement slurry suppresses the maldistribution of a light-weight aggregate and enhances cement strength.

The invention claimed is:

1. An additive for cement slurry for a well, comprising:
   an aqueous dispersion of layered silicate; and
   silica,
   wherein
   a solid content concentration of the layered silicate is 0.01 to 5% by mass,
   a solid content concentration of the silica is 0.3 to 30% by mass,
   a mass ratio of the layered silicate to the silica is 0.01 to 0.1, and
   an average particle size of a dispersoid in the aqueous dispersion by laser diffractometry is 0.1 to 30.0 μm.

2. The additive for cement slurry for a well according to claim 1, wherein the well is an oil well or a geothermal well.

3. The additive for cement slurry for a well according to claim 1, wherein the layered silicate comprises at least one layered silicate selected from the group consisting of montmorillonite, hectorite, saponite, stevensite, beidellite, volkonskoite, nontronite and sauconite.

4. The additive for cement slurry for a well according to claim 1, wherein the layered silicate is purified bentonite containing 90% by mass to 99.9% by mass of montmorillonite.

5. The additive for cement slurry for a well according to claim 1, wherein the pH of the additive is 2 to 11.

6. A method for producing an additive for cement slurry for a well according to claim 1, comprising the step of
   adding layered silicate to an aqueous dispersion of silica to form an aqueous dispersion containing layered silicate and silica and mixing the resultant aqueous dispersion containing layered silicate and silica with stirring to obtain a mixed aqueous dispersion of layered silicate and silica.

7. The additive for cement slurry for a well according to claim 1, wherein said additive is not a cement composition.

8. The additive for cement slurry for a well according to claim 1, wherein the mass ratio of the layered silicate to the silica is 0.01 to 0.08.

9. A method for producing an additive for cement slurry for a well according to claim 1, comprising the steps of:

adding layered silicate to water to form a composition containing layered silicate and water and mixing the resultant composition with stirring to obtain an aqueous dispersion of layered silicate; and adding the aqueous dispersion of layered silicate to an aqueous dispersion of silica and mixing the resultant with stirring to obtain said aqueous dispersion of layered silicate and silica.

10. The method for producing an additive for cement slurry for a well according to claim 6, wherein the aqueous dispersion of silica is formed using silica having an average particle size of 3 to 300 nm converted from a specific surface area obtained through measurement by a nitrogen adsorption method.

11. A cement slurry for a well, comprising:
an additive according to claim 1, wherein the cement slurry for a well comprises
0.001 to 0.05% BWOC of layered silicate,
0.01 to 0.8% BWOC of silica,
50 to 80% BWOC of water, and
10 to 50% BWOC of aggregate comprising at least one type of hollow particle selected from the group consisting of a hollow aluminosilicate particle, a hollow borosilicate glass particle, a hollow silica particle, a hollow pearlite particle, a hollow fly ash particle, a hollow alumina particle, a hollow ceramic particle, a hollow polymer particle and a hollow carbon particle.

12. The cement slurry for a well according to claim 11, further comprising
0.1 to 5% BWOC of a cement hardening retarder, and
0.001 to 10% BWOC of at least one auxiliary agent selected from the group consisting of a dehydration regulator, an antifoamer, a hardening accelerator, a cement dispersant, a cement strength stabilizer, and a lost circulation material.

13. The cement slurry for a well according to claim 11, wherein the light-weight aggregate comprises at least one hollow particle selected from the group consisting of a hollow aluminosilicate particle, a hollow borosilicate glass particle, a hollow silica particle, a hollow pearlite particle, a hollow fly ash particle, a hollow alumina particle, a hollow ceramic particle, a hollow polymer particle and a hollow carbon particle.

14. The cement slurry for a well according to claim 11, wherein the specific weight of the slurry is 1.2 or more and less than 1.6.

15. The cement slurry for a well according to claim 11, wherein when a 50 mm in diameter×300 mm high cylindrical hardened cement obtained by hardening the cement slurry for a well is equally divided into 3 portions which are an upper portion, a medium portion and a lower portion, difference in density of the hardened cement between the upper portion and the medium portion is 0.15 or more.

16. A cementing method for a well, comprising:
injecting a cement slurry for a well according to claim 11 to a gap between a casing pipe inserted in the well and the stratum in boring of the well, followed by hardening the cement slurry.

17. An additive for cement slurry for a well, comprising:
an aqueous dispersion having a pH of 2 to 11 comprising layered silicate which comprises at least one layered silicate selected from the group consisting of montmorillonite, hectorite, saponite, stevensite, beidellite, volkonskoite, nontronite and sauconite; and
silica,
wherein,
a solid content concentration of the layered silicate is 0.5 to 3% by mass,
a solid content concentration of the silica is 1 to 25% by mass,
a mass ratio of the layered silicate to the silica is 0.02 to 0.08,
an average particle size of a dispersoid in the aqueous dispersion by laser diffractometry is 0.5 to 20.0 µm; and
said additive is not a cement composition.

* * * * *